Patented Mar. 8, 1938

2,110,410

UNITED STATES PATENT OFFICE 2,110,410

PRESERVATION OF FRESH FLESH PRODUCTS

Severin O. Westby and William E. Lund, near Seattle, Wash.

No Drawing. Application June 28, 1935, Serial No. 28,894

1 Claim. (Cl. 99—157)

Our invention relates to the art of preserving food products, and more particularly to a wrapper in which food products may be wrapped for storage, and the method of making such a wrapper.

This application supersedes our application Serial No. 654,780, filed February 1, 1933, and is a continuation in part of said application.

Certain types of food products, which may not disintegrate or decay very readily, may nevertheless become unpalatable through the loss of moisture. This phenomenon may be observed in such products as bread and cake, for example, when they are kept for a time at ordinary temperatures. A similar action takes place to an even greater degree in food products which are kept in cold storage plants at temperatures lower than normal atmospheric temperatures. At such lower temperatures the air cannot hold as much moisture, and this dry atmosphere has a pronounced desiccating effect.

Perhaps the most noticeable desiccating effect is evidenced by the freezer burn found in meat, for instance, pork loins and poultry, which has been kept in cold storage. Not only does freezer burn scar the meat and render it unsightly, thus impairing its salability, but the loss of moisture also detracts from the taste of the meat and freezer burn marks, of course, warn a purchaser that the flavor will be poor.

In addition to the injury to the appearance and palatability caused by desiccation there may be a noticeable decrease in the weight of the meat or other product. This weight loss, even though it may often be small, say from 5% to 10%, nevertheless materially affects the sale price of the meat when, as is usually the case, the price depends upon the weight, as when sold on a poundage basis. Because of these considerations it will be seen that it is extremely desirable to eliminate desiccation in many different kinds of food products, such as bread, meat, fowl, berries, and the like, whether or not such products are subjected to refrigeration temperatures, and especially when so subjected.

Since such food products are nearly always wrapped when stored, we have developed a moisture-proof wrapper, which will prevent moisture escaping from the food product package. Injurious desiccation is thus prevented, even though the product is stored for a considerable length of time. When enclosed in such a wrapper, meat and fowl do not become freezer burned; berries and other fruit and vegetable products do not shrivel up, and bread and cakes do not dry out but retain their moist fresh taste. Such a wrapper is also useful for preserving salt codfish. Conventional types of wrapping, not being moisture-proof, cannot hold the salt and moisture in the package, so that salt from the codfish often becomes encrusted on the exterior of the package, thus rendering it unsightly and unsalable, as well as allowing the preservative to escape from the codfish in the package.

Our wrapper, therefore, may be used advantageously for wrapping any type of food product in which loss of moisture is undesirable, whether such loss affects only the weight of the product or in addition affects its flavor, appearance or keeping qualities. As an example of one field in which our wrapper has proved very effective we may refer to the preservation of poultry, more particularly when it is kept in cold storage. A product of this type, if not preserved in a moisture-proof package, will not only lose weight, but its appearance, tenderness and flavor will be greatly impaired.

Poultry is extremely sensitive to freezer burn, and it has long been a problem to preserve it satisfactorily without injury. Heretofore poultry has been wrapped in various types of paper in an effort to prevent freezer burn, but ordinary paper is porous and pervious to moisture, so that the capillary attraction of the paper aginst the fowl draws the juices from the meat, transmits them through the wrapper, and allows them to evaporate into the air, thus causing desiccation of the fowl, with the accompanying injurious effects above described.

Treated papers of various kinds have been employed in an effort to obtain a moisture-proof package. Paraffined or waxed paper has been used, but when such paper is wrapped about an irregular object, such as a fowl which has projecting legs, wings and neck, the brittle wax film is honeycombed with minute cracks, which, of course, destroy the continuity of the moisture-proof film, so that the wrapped product drys out. The paper will still attract and conduct away moisture where the wax coating is broken, and hence the problem is not solved by employing a wrapper of waxed paper. All coated paper wrappers have proven unsuitable, since the moisture-proof coatings crack when the paper is bent in packaging.

An improved type of wrapper has employed oil or grease to impregnate the paper, but the use of such paper for wrapping poultry or meat to prevent freezer burn has not been practiced to our knowledge except by ourselves. Such a wrapper, however, also has certain drawbacks. While oiled paper possesses the advantages of being inexpensive, light, easily handled and easily destroyed after use, it is not suitable for all types of package. Either one of two methods may be employed in wrapping poultry and cuts of meat. By one method each fowl is wrapped as a unit, the wrapper completely enclosing the fowl and separating it from contact with other fowls packed in the same box. The other method of wrapping involves placing a liner in a packing box, and then placing the fowls in the box, inside the liner and in contact with each other. After a number of fowls have been packed, the wrapper is folded over to surround them all in a single package. In either case, however, the wrapper comes into contact with the side of the box or perhaps with other foreign objects. At the point of such contact the capillary attraction of the box, for example, will draw the oil from the wrapper, and it will lose its moisture-proof character at that point.

We have therefore discovered that neither papers coated with wax or other material, nor papers merely impregnated with oil or grease, are entirely satisfactory as wrappers for food products, for the reasons mentioned. Furthermore, it has heretofore been considered unfeasible to coat an oil-impregnated paper because the oily surface of the paper prevented the wax film from adhering to the paper's surface. We know of no paper which has employed both an impregnating liquid and a surface coating.

As a solution to the problem of providing a water-proof wrapper, we have discovered that a paper impregnated with oil could be kept in moisture-tight condition if its surface be insulated in such a way as to prevent contact of the oiled paper with foreign objects having a capillary attraction for the oil. As the insulating medium we employ a wax coating for the paper, and in order to make such a coating adhere to the surface of the paper we have developed a process for insuring that the impregnating oil would be removed from the surface of the paper before the wax coating was applied.

The paper which we have developed, then, is both oil impregnated and wax coated. Although the wax may crack, leaving minute channels when the wrapper is placed about a fowl, for example, the paper will nevertheless remain moisture-proof because the impregnating oil seals the cracks in the wax. This impregnating oil cannot be removed from the paper because, although the wax may crack, it nevertheless acts as a spacing element to prevent contact of the packing box or any other object with the surface of the paper. Thus our paper product will remain moisture-proof no matter what wrapping method is employed, and no matter what kind of food product is wrapped. No matter how long the food is stored, the oil film, protected by the wax coating, will remain as a persistent moisture-retaining film surrounding the product, thus retaining within the package all the natural moisture.

The novel method which we have employed to make this oil-impregnated wax-coated paper comprises chiefly three steps. Ordinarily the finished paper comes in large rolls. As the paper is unrolled, it may be guided through a set of rolls, one of which may dip into an oil bath. The oil picked up by the roll is carried up to the paper being fed through the set of rolls, and is applied thereto. The oil employed should be odorless, tasteless and colorless, so that it will not contaminate the food product about which the paper is wrapped, if any oil should seep through to the surface. As an example, one oil which we have found suitable for this purpose is light, clear, mineral oil or petrolatum, U. S. P. purity, having about 60 to 75 viscosity. Such an oil is preferably of the paraffine base type.

The oil may be applied to one or both sides, but it is usually sufficient to apply the oil to one side only of the paper. The paper may then be fed through a second set of rolls to squeeze out any excess of the oil, and to remove it partially from the surface. Such a squeezing operation, however, we have found to be inadequate to remove all or most of the oil from the surface of the paper, so that the wax coat may be applied, and the wax will not adhere while any surface film of oil remains. In order to prepare the paper for waxing, therefore, it may be again rolled into a tight roll, so that each part is pressed between layers of oiled paper, or otherwise stored in bulk, and cured by allowing the oiled paper to stand for about fifteen days or more, so that the oil may leave the surface of the paper and penetrate thoroughly into the pores or along the fibers thereof. Other ways might be employed for removing this surface oil, but we have found that allowing the paper to stand both removes the surface oil and insures that a tenacious film has thoroughly impregnated the central portion of the paper.

After the paper has thus been cured it may be passed through a waxing bath, so that both sides of the paper receive a coating of wax, or paraffine, which adheres closely thereto. If preferred, however, the wax coat may be applied on one side only, that is, on the side which will normally be away from the food product wrapped, and on the outside of the package.

The wrapping paper thus formed may be cut into wrappers of any convenient size, depending upon the purpose for which they are intended to be used. The oil, known as liquid petrolatum, having penetrated deeply as a persistent film through the pores of the paper, will maintain a moisture-proof seal, unbroken, for the oil will not evaporate even at temperatures above 100° F., and the wax coating will prevent it from being removed through capillary action. Because of the nature of the oil it will remain fluid at refrigerating temperatures of 10° or 20° below zero F., so that it is suitable for use in wrapping products to be stored at any desired temperature over a widely varying range. The principal precaution which must be taken, of course, is to insure that the wrapper in packaging completely surrounds the food product, with the loose ends folded over to prevent the escape of moisture about the edges of the wrapper. It may be desirable, though not usually considered necessary, to cut the wrapper to a particular shape, to facilitate wrapping products of peculiar conformation.

A wrapper having similar characteristics may, of course, be made with a product other than paper used as a base, for example, paper board or fiber board containers, liners or boxes might be used, the walls of which would be impregnated with oil and the surfaces coated with wax in the same manner as described for the treatment of paper wrappers.

What we claim as our invention is:

The process of preserving fresh flesh products in cold storage, and protecting them from desiccation and freezer burn, which comprises enclosing the flesh products with a wrapper of paper the fibers of which have been previously impregnated with oil in sufficient quantity to form a film nonpermeable by moisture, which is persistent under the conditions of cold storage, and which wrapper after such impregnation has been coated with wax to prevent absorption of the oil film by surfaces with which the wrapper may come in contact, during preservation, and thereafter subjecting the wrapped products to cold storage at temperatures suitable for the preservation of the particular flesh product.

SEVERIN O. WESTBY.
WILLIAM E. LUND.